US012162788B1

(12) United States Patent
Danner et al.

(10) Patent No.: US 12,162,788 B1
(45) Date of Patent: Dec. 10, 2024

(54) THREE DIMENSIONAL FABRIC MEDIA FOR USE WITH MOVING BED BIOFILM REACTORS AND SYSTEMS RELATED THERE TO

(71) Applicant: ENTEX Technologies Inc., Chapel Hill, NC (US)

(72) Inventors: Jeffrey B. Danner, Chapel Hill, NC (US); Wayne J. Flournoy, Chapel Hill, NC (US)

(73) Assignee: ENTEX Technologies Inc., Chapel Hill, NC (US)

( * ) Notice: Subject to any disclaimer, the term of this patent is extended or adjusted under 35 U.S.C. 154(b) by 0 days.

(21) Appl. No.: 16/929,355

(22) Filed: Jul. 15, 2020

(51) Int. Cl.
| | | |
|---|---|---|
| C02F 3/10 | (2023.01) | |
| C02F 3/08 | (2023.01) | |
| C02F 3/28 | (2023.01) | |
| C02F 3/30 | (2023.01) | |
| C02F 103/00 | (2006.01) | |

(52) U.S. Cl.
CPC .............. *C02F 3/103* (2013.01); *C02F 3/085* (2013.01); *C02F 3/106* (2013.01); *C02F 3/109* (2013.01); *C02F 3/2806* (2013.01); *C02F 3/301* (2013.01); *C02F 2103/007* (2013.01); *C02F 2203/004* (2013.01)

(58) Field of Classification Search
CPC .......... C02F 3/103; C02F 3/085; C02F 3/301; C02F 3/2806; C02F 3/109; C02F 3/106; C02F 2103/007; C02F 2203/004
USPC ............... 210/615, 616, 617, 618, 150, 151
See application file for complete search history.

(56) References Cited

U.S. PATENT DOCUMENTS

| | | | |
|---|---|---|---|
| 7,445,715 B2 | 11/2008 | Pehrson et al. | |
| 10,676,382 B1 | 6/2020 | Danner et al. | |
| 11,254,593 B1 | 2/2022 | Danner et al. | |
| 2006/0138048 A1* | 6/2006 | Hu .......................... | C02F 3/103 210/150 |
| 2006/0163157 A1* | 7/2006 | Cote ...................... | C02F 3/208 210/615 |
| 2008/0245731 A1* | 10/2008 | Monosov ................ | C02F 3/103 210/615 |
| 2011/0068057 A1* | 3/2011 | Haley, III ............... | C02F 3/006 210/619 |
| 2012/0037551 A1* | 2/2012 | Kenyeres ............... | C12M 25/14 210/150 |

(Continued)

FOREIGN PATENT DOCUMENTS

| | | | |
|---|---|---|---|
| DE | 101 43367 A1 | * | 3/2003 |
| DE | 10132546 C1 | * | 6/2003 |

OTHER PUBLICATIONS

Machine-generated English Translation of DE 10143367 A1, generated on Aug. 9, 2021.*

(Continued)

*Primary Examiner* — Fred Prince
(74) *Attorney, Agent, or Firm* — MacCord Mason PLLC

(57) ABSTRACT

Three dimensional fabric media of the present invention are used with moving bed biofilm reactors, and are generally constructed of an open weave substrate that allows the diffusion of gas, nutrients and food, while protecting and serving as an attachment site for a variety of microbial colonies in both anoxic and aerobic zones. The media is preferably constructed of high-density polyester fiber and has a specific gravity of approximately 0.96.

6 Claims, 8 Drawing Sheets

(56) References Cited

U.S. PATENT DOCUMENTS

2013/0001161 A1* 1/2013 Boner ................. C02F 3/04
    210/615
2016/0002079 A1* 1/2016 Nivargi ............. C02F 3/108
    210/615
2016/0009578 A1* 1/2016 Cote ............... B01D 63/027
    210/615

OTHER PUBLICATIONS

Machine-generated English Translation of DE 10132546 C1, generated on Aug. 9, 2021.*

* cited by examiner

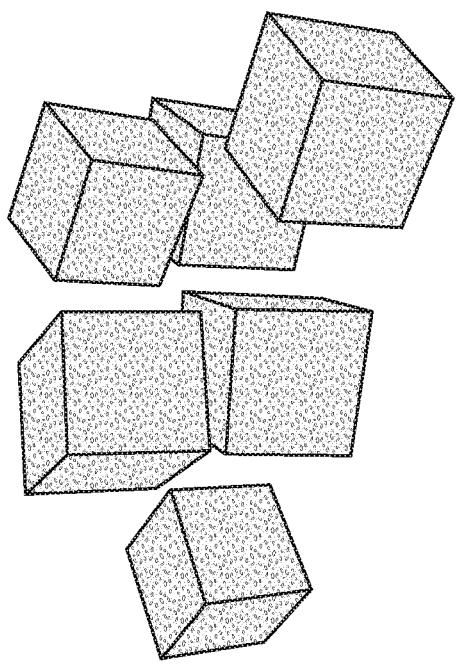
FIG. 2 – PRIOR ART
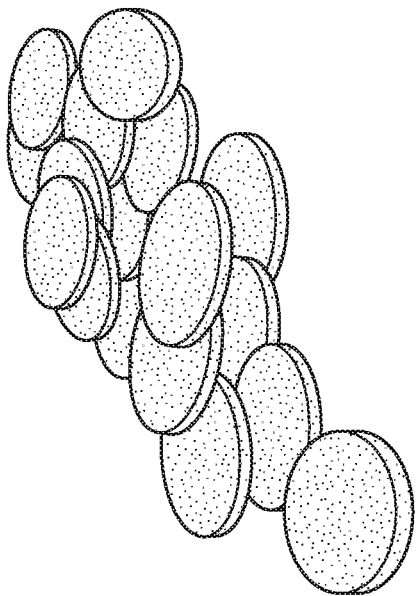
FIG. 4 – PRIOR ART
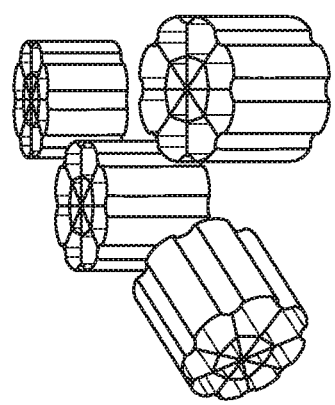
FIG. 1 – PRIOR ART
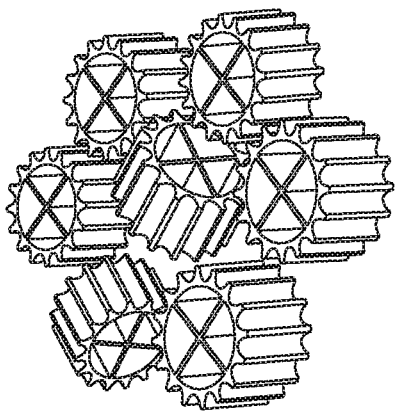
FIG. 3 – PRIOR ART

THREE DIMENSIONAL FABRIC MEDIA FOR USE WITH MOVING BED BIOFILM REACTORS AND SYSTEMS RELATED THERE TO

BACKGROUND OF THE INVENTION

Field of the Invention

This invention relates to wastewater management, and in particular to media used in Moving Bed Biofilm Reactors (MBBRs).

Description of the Prior Art

Proper remediation of wastewater is critical to life, health and the environment. Many major advancements in human civilization and catastrophic historical events can be linked to the presence or absence of clean drinking water, and/or the presence or absence of contaminated water.

Wastewater treatment is the physical, chemical, and/or biological processes of removing contaminants from wastewater in order to produce water that is environmentally safer. Safe drinking water from a municipal water source is an example of treated wastewater.

Wastewater treatment has two major components: primary treatment removes contaminants including grease, dirt, gravel, and floatable waste; and secondary treatment removes additional suspended solids and pollutants. Secondary treatment often incorporates biological processes.

Moving bed bioreactors (MBBR) are secondary treatment systems that rely on self-sustaining micro-ecosystems wherein microorganisms become attached to a growth medium and a biological film is formed on that medium. An MBBR system generally includes an aeration tank with free-floating carrier media members that provide a surface where the biofilm can grow. Organic matter in the wastewater diffuses into the film, where it is metabolized. As organisms grow and reproduce, the biofilm thickness increases, with portions of the film periodically sloughing off.

In what are considered improvements on biological process technologies, a variety of growth media systems for treating wastewater, and module-based systems for treating wastewater, have evolved. The Applicant's patents listed herein are incorporated by reference in their entirety: System for treating wastewater and a controlled reaction-volume module usable therein, U.S. Pat. No. 7,445,715 B2, filed Nov. 22, 2005; Wastewater treatment method, U.S. Pat. No. 7,854,843 B2, filed Mar. 8, 2010; System for treating wastewater having a controlled reaction-volume module usable therein, U.S. Pat. No. 7,691,262 B2, filed Oct. 13, 2008; Media for supporting growth biology within a wastewater treating system, U.S. Pat. D718412 S1, filed Dec. 3, 2012; Extruded media for supporting growth biology within a wastewater treating system, U.S. Pat. D618760 S1, filed Nov. 2, 2009; Media for supporting growth biology within a wastewater treatment system, U.S. Pat. D762279 S1, filed Nov. 24, 2014; Anoxic system screen scour, U.S. Pat. No. 8,568,593 B1, filed Jun. 2, 2010; Extruded media for supporting growth biology within a wastewater treating system, U.S. Pat. D672009 S1, filed Jun. 8, 2010; System and method for biologically treating wastewater using low density, high surface area substrates, U.S. patent application Ser. No. 16/147,144, filed Sep. 28, 2018; System and method for biologically treating wastewater using low density, high surface area substrates, U.S. patent application Ser. No. 15/931,775, filed May 14, 2020; and Floating system and method for biologically treating wastewater using low density, high surface area substrates, U.S. Pat. No. 877,856, filed May 19, 2020.

Known media have multiple shortcomings. Referring to FIGS. 1-4, one problem is that known media have limited surface area, which means that each individual carrier can only accommodate a relatively small amount of biofilm.

A related shortcoming is that much of the limited surface area on known media is the outermost surface. This outermost surface is subjected to many mechanical forces within the MBBR system, such as impact with mixer blades, and collisions with other media members. The vulnerable outmost surfaces provide little protection for emerging microbial colonies.

Another disadvantage of known media is that they provide a habitat for a limited number of microbial species, thereby limiting the variety of wastes that can be consumed within the biofilm.

Another shortcoming of known media is that they are capable of developing an aerobic zone or an anoxic zone, or possibly an aerobic zone with a thin anoxic layer, but cannot simultaneously facilitate nitrification and complete denitrification within an MBBR system.

Yet another shortcoming is that known media are typically constructed of extruded plastic, which is brittle and can be broken upon impact with mixer blades used in MBBR systems. Indeed broken media has been observed in aerated systems that don't have mixer blades. Broken carrier media are problematic because they can escape the secondary treatment system and travel downstream escaping into receiving bodies of water.

As can be seen, there is a need for media having a very high surface area per unit volume compared to traditional MBBR media. It is desirable that the media have substantial surface area that protects emerging microbial colonies, provide a habitat to a wide variety of microbial species, and lend itself to providing a steep and sustained oxygen concentration gradient. It is also desirable that the media are flexible and can withstand mechanical forces within the MBBR system, including impacts with mixer blades.

SUMMARY OF THE INVENTION

The present invention includes three dimensional fabric media used with moving bed biofilm reactors. The media is preferably constructed of a high-density polyethylene (HDPE) fiber having an open weave construction, and a specific gravity of approximately 0.96. The media has a very high surface area per unit volume that allows the diffusion of gas, nutrients and food, while protecting and serving as an attachment site for a variety of microbial colonies. Fabric media of the present invention facilitates the development of both anoxic and aerobic zones, thereby allowing both types of colonies to establish and thrive, thereby simultaneously nitrifying and denitrifying the wastewater.

BRIEF DESCRIPTION OF THE DRAWINGS

FIGS. 1-4 are known carrier media members;

DETAILED DESCRIPTION AND THE PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 5:
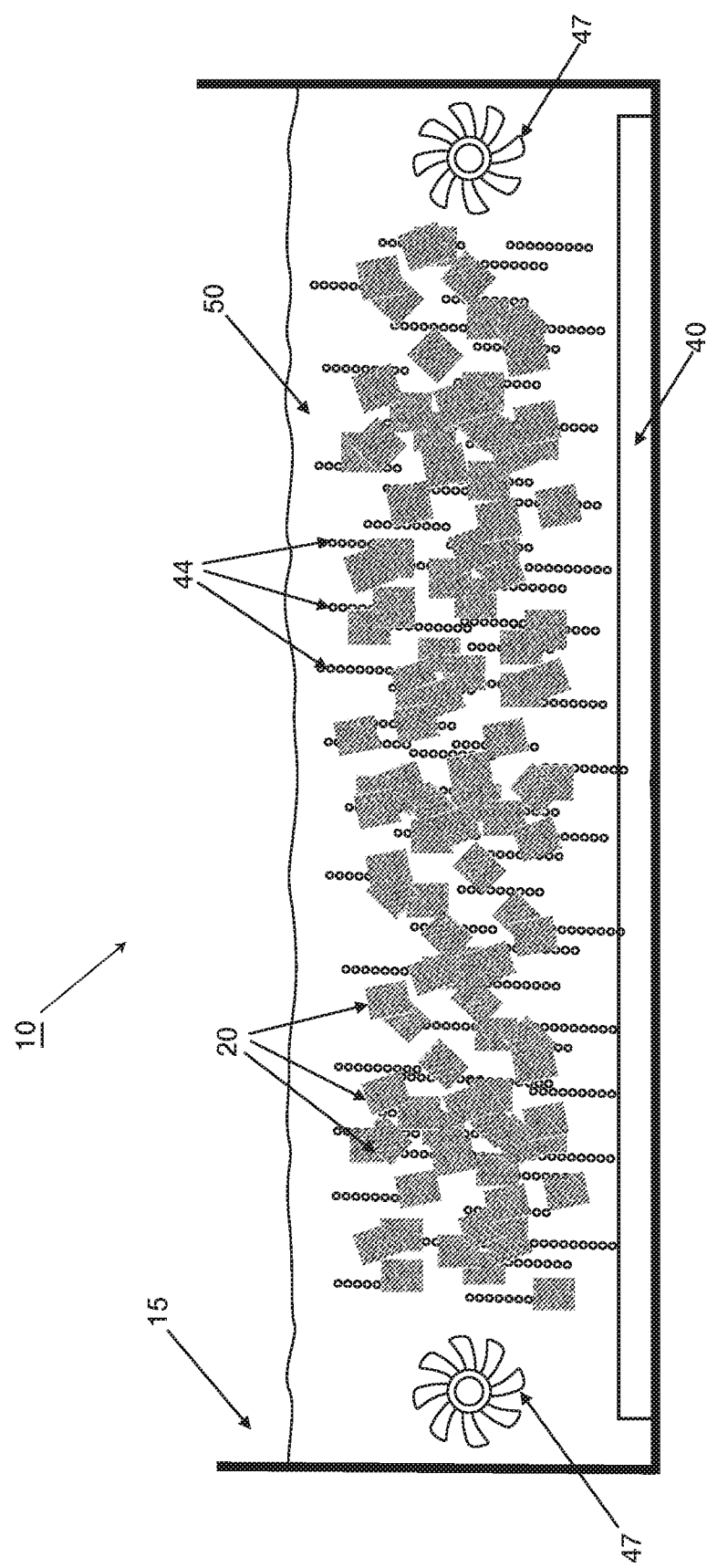
FIG. 5 depicts an MBBR system using media of the present invention.
Figure 6:
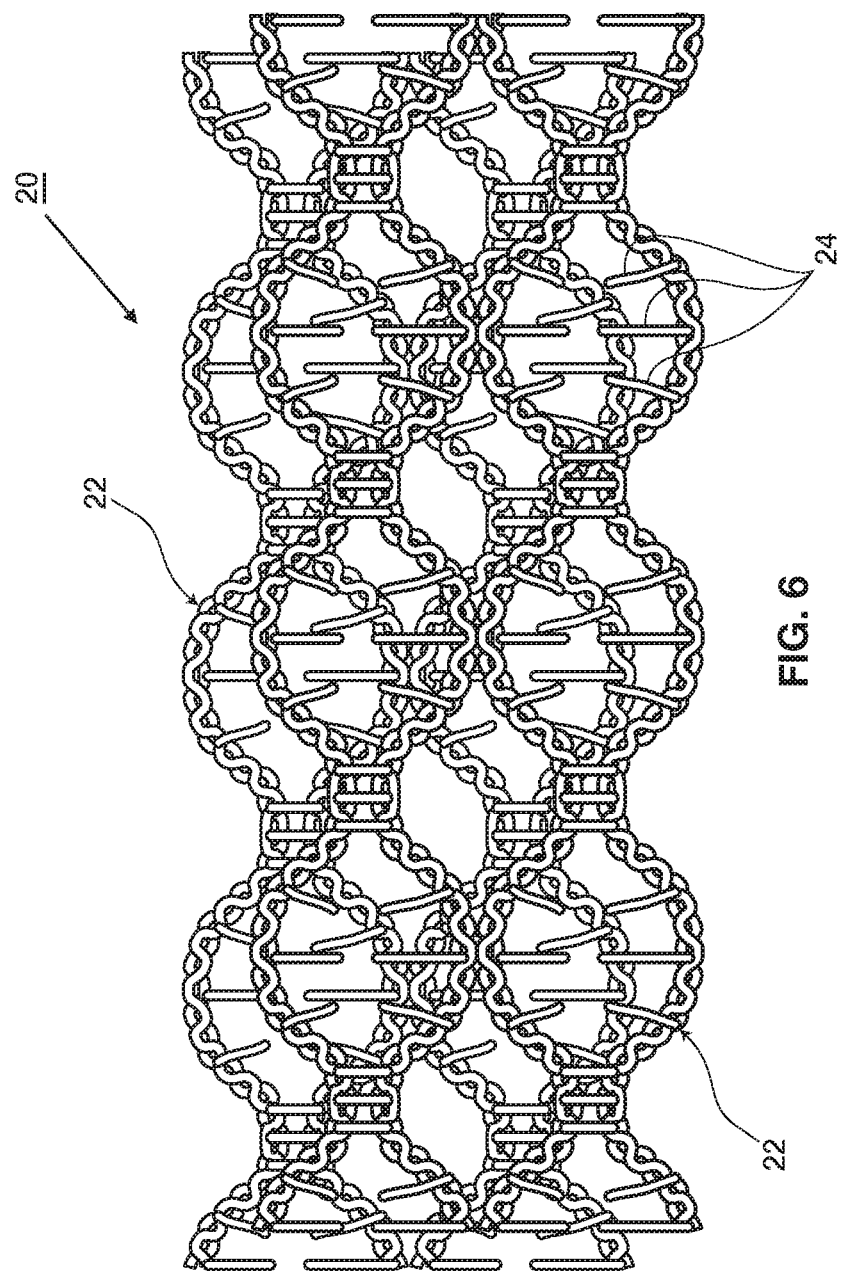
FIG. 6 is a top-view depiction of media of the present invention.

Referring to FIG. 5, treatment system 10 generally includes body of water 15, for example a wastewater tank or lagoon, including aerator 40. Air 44 bubbling up from aerator comes in contact with individual members of carrier media 20. As used herein, "air" shall refer to gaseous matter including ambient gas, oxygen and/or nitrogen. The preferred aeration system is a coarse bubble aeration system with full floor coverage. A system may also include at least one mixer 47, which preferably continuously circulates media in a random motion. Mixers are required for anoxic environments, but optional for aerobic. It is strongly preferred that the system include media retention screens on the discharge (not shown) having gaps no more than ⅔ the size of the smallest media dimension, typically 3-6 mm, which retain the media within the tank.

Figure 7:
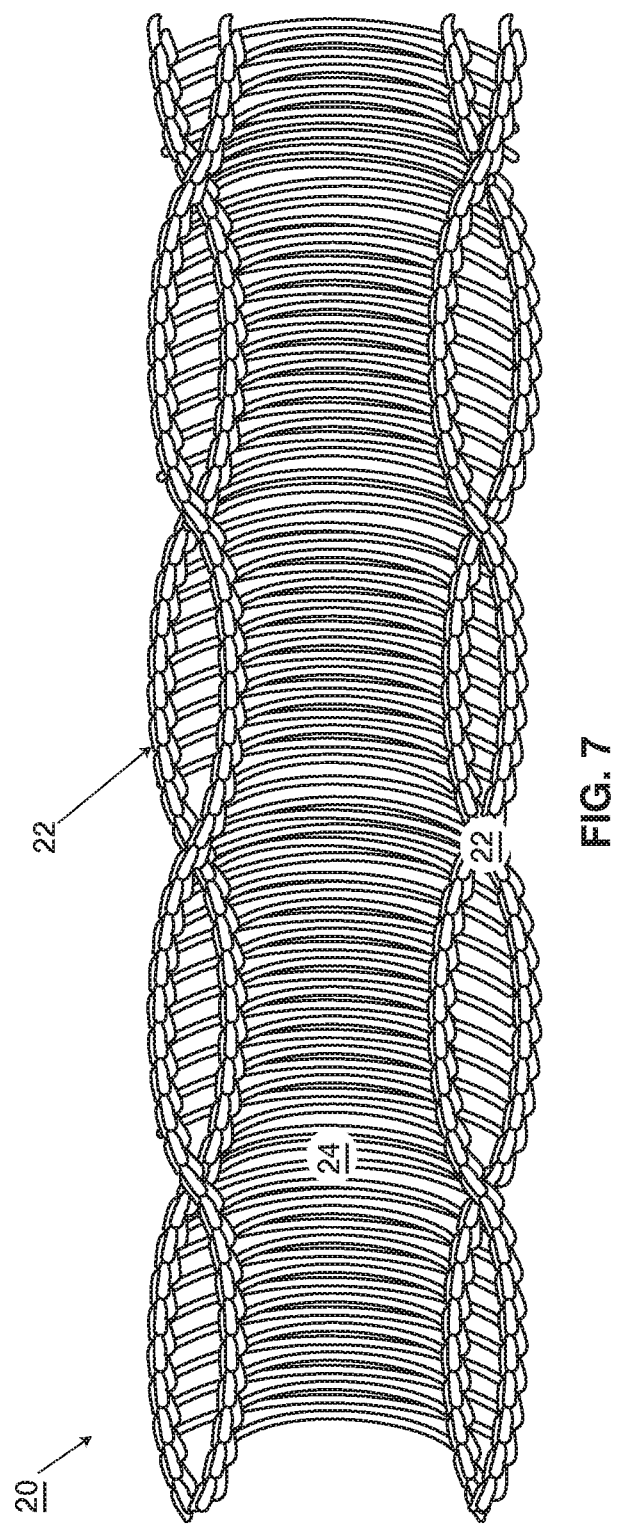
FIG. 7 is a side-view depiction of media of the present invention.
Figure 8:
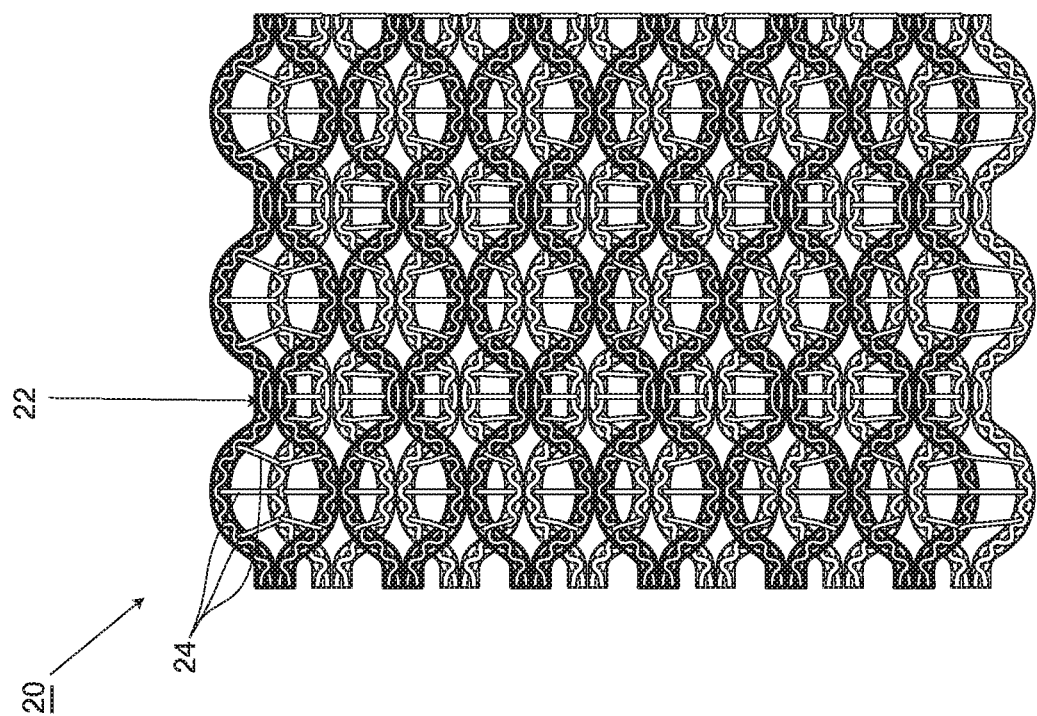
FIG. 8 is a top-view close-up depiction of media of the present invention.
Figure 9:
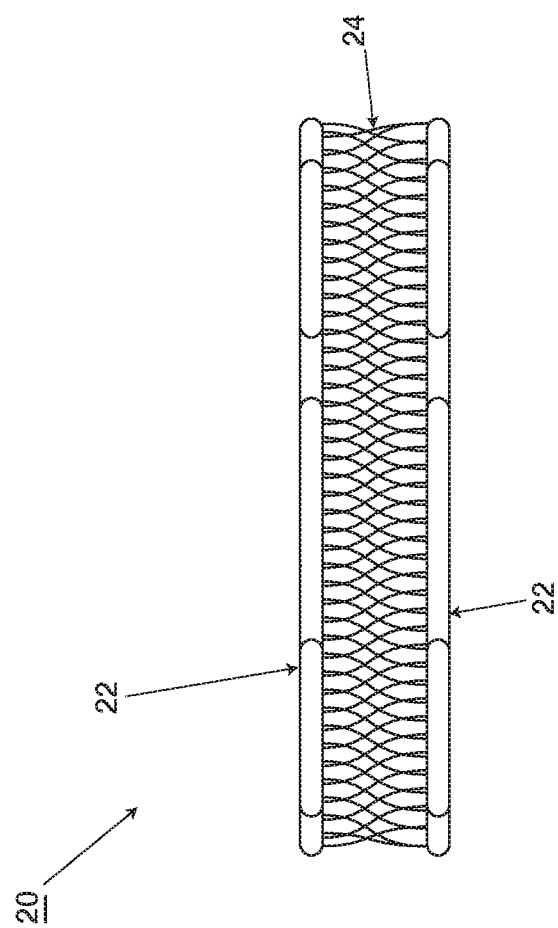
FIG. 9 is a side-view close-up depiction of media of the present invention.

As shown in FIGS. 7-9, media 20 generally includes two outer surfaces 22, with a plurality of fibers 24 joining the two surfaces. The fibers are preferably curved. In a preferred embodiment each outer surface is less than 3 mm thick, and the total thickness of the media is approximately 3 mm to approximately 20 mm. Each member of media is preferably approximately 25 to approximately 75 mm in length, and approximately 25 to approximately 75 mm in width. Each member of media is preferably rectangular, hexagonal or triangular, but other shapes including circles, ovals and polygons are also within the scope of the present invention. Outer surfaces preferably have a hexagonal shaped weave pattern, although other weave patterns, for example rounded, squares, triangles, diamonds, and so forth, are also within the scope of this invention. The outline of the hexagons on surfaces 22 preferably have raised edges of approximately 5 mm to approximately 20 mm.

The open weave pattern allows gas, nutrients and food to diffuse to the biofilm surfaces at a high rate, which facilitates a high rate of wastewater treatment. It also provides "walls" that physically protect and shield emerging microbial colonies when they are vulnerable. Fibers 24 provide a large amount of surface area per unit of volume of fabric, and provide an ideal environment for microbial attachment and growth. Among the types of microbial growth may include AOB, NOB, PAO and annamox microorganisms.

In a preferred embodiment media 20 has a surface area between approximately 800 and approximately 4,000 square meters per cubic meter, and most preferably between approximately 1,000 and approximately 2,000 square meters per cubic meter. In a preferred embodiment the media is constructed of high-density polyester (HDPE), but other plastics such as polypropylene, low density polyethylene, or blends of one or more different plastics or other fibers with a combined specific gravity of less than approximately 0.96 are also suitable. Apex Mills of Inwood, NY is a source for custom designed 3-D spacer fabric that would be suitable for use in this invention. In one embodiment the specific gravity of the media is less than 0.94 to approximately 0.98, with 0.96 being particularly desirable. The preferred HDPE material has a specific gravity of 0.96.

Figure 10:
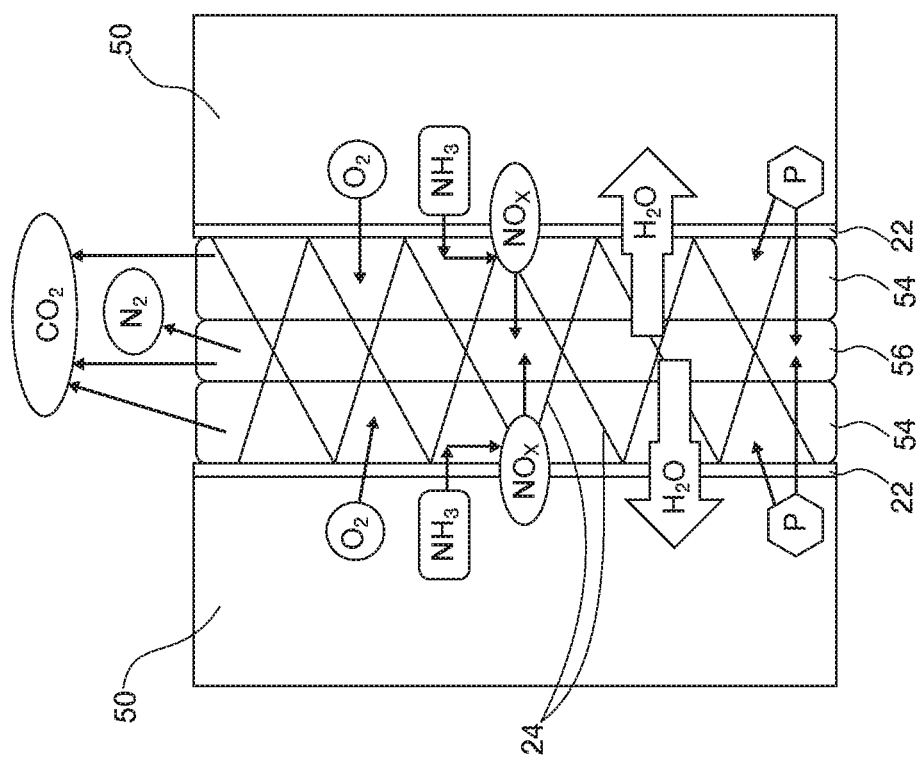
FIG. 10 graphically depicts various metabolic processes performed by media of the present invention.

The structural characteristics of media 20, namely surfaces 22 that allow gas, nutrients and food diffusion in combination with interconnecting fibers 24 that create "deep recesses", allow for the development of a steep and sustained gradient of oxygen concentration to develop within the media. The various metabolic processes that take place on surfaces 22, aerobic zone 54 and anoxic zone 56 are schematically depicted in FIG. 10.

Figure 11:
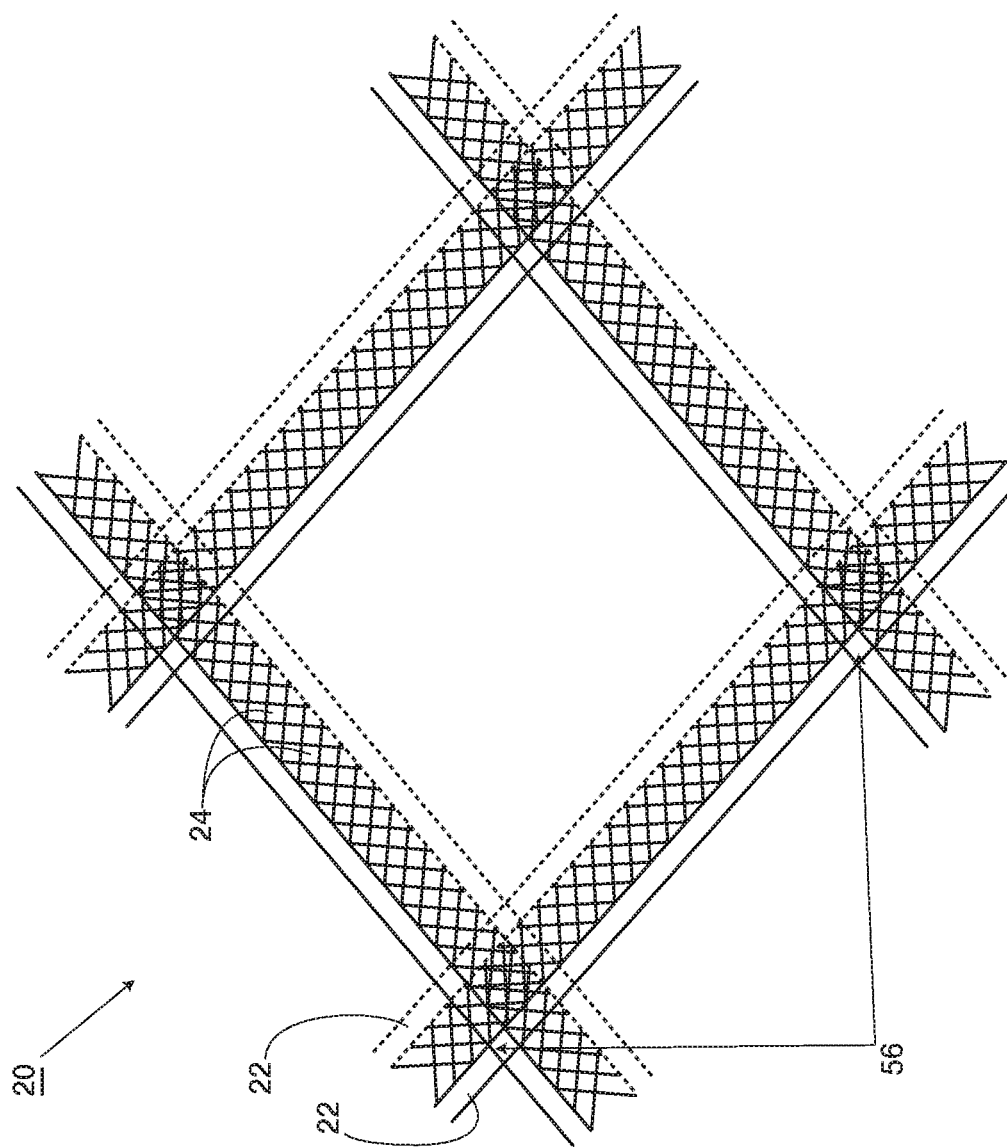
FIG. 11 depicts the oxygen gradient in media of the present invention.

Referring to FIG. 11 which depicts one "diamond" of media 20, areas surrounded by media material, for example where edges of diamonds meet, create anoxic zones 56, while areas more central to center of diamond create aerobic zones 54. In the proper operating conditions these microhabitats support life for both aerobic and anaerobic microbes, thereby supporting simultaneous nitrification and denitrification. It is noted that these metabolic activities essentially mimic the desirable action of anammox bacteria, but without the challenges associated with maintaining viable anammox colonies.

In use, media 20 of the present invention is introduced into an aerated body of water in need of treatment. Media 20 is optionally inserted into tank with media retention device on discharge. The body of water is preferably circulated, with coarse and fine bubble aeration serving as a suitable means for circulation in aerobic applications and mixers serving as a suitable means for circulation in anoxic applications. Media 20 is colonized by various microbes, and those microbes carry out their normal metabolic functions. The system is preferably periodically examined to ensure proper formation of biofilm, proper functioning of aerators and diffusers, and so forth.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, modifications may be made without departing from the spirit and scope of the invention as set forth in the following claims. It should be understood that "approximately" and the like shall refer to +/−10% unless otherwise stated or contrary to common sense, and that ranges of values set forth inherently include stated endpoints, as well as all increments between. Moreover, "substantially" and the like shall mean generally true. By way of example, a substantially permanent attachment is capable of removal, but damage is likely to occur, and a substantially planar surface may have irregularities.

What is claimed is:

1. A Moving Bed Biofilm Reactor system including:
   A. A body of water; and
   B. A plurality of woven media members each consisting essentially of two outer surfaces being less than three millimeters in thickness, having a specific gravity between 0.94 and 0.98, having a length between 25 to 75 millimeters, having a width between 25 to 75 millimeters, and connected with a multitude of interconnecting fibers in an open weave pattern, wherein said multitude of interconnecting fibers being curved and joining said two outer surfaces whereby said plurality of woven media members and said multitude of interconnecting fibers are spaced to define a plurality of recesses developing a sustained gradient of oxygen concentration within said media members, and wherein said woven media members having a surface area consisting essentially of approximately 1,000 to approximately 2,000 square meters per cubic meter and thereby adapted to provide a high surface area per unit volume to accommodate an amount of biofilm and withstand a mechanical force within said Moving Bed Biofilm Reactor system consisting essentially of impact with at least one mixer blade.

2. The system of claim 1 wherein each of said media members has a specific gravity of approximately 0.96.

3. The system of claim 1 wherein said plurality of woven media members are maintained within a media retention device.

4. The system of claim 1 wherein said plurality of woven media members are constructed of high-density polyethylene.

5. The system of claim 1 further including at least one colony of aerobic bacteria and at least one colony of anoxic bacteria, said colonies imbedded in said woven media members.

6. The system of claim 5 wherein said colonies of aerobic bacteria and anoxic bacteria are embedded in said multitude of fibers, including an edge portion adapted to create an anoxic zone and a central portion adapted to create an aerobic zone.

* * * * *